United States Patent
Koegler et al.

[11] Patent Number: 5,916,979
[45] Date of Patent: Jun. 29, 1999

[54] ORGANOSOL POLYESTER COATING MATERIALS AND A PROCESS FOR THEIR PREPARATION

[75] Inventors: Dietrich Koegler, Wuppertal; Martin Schmitthenner, Wetter, both of Germany

[73] Assignee: Huels Aktiengesellschaft, Marl, Germany

[21] Appl. No.: 08/968,703

[22] Filed: Nov. 12, 1997

[30] Foreign Application Priority Data

Nov. 12, 1996 [DE] Germany ............ 196-46-640-7

[51] Int. Cl.⁶ ............... C08L 75/06; B05D 7/00; B05D 3/00
[52] U.S. Cl. .............. 525/440; 525/443; 523/100; 524/507; 427/299; 427/407.1
[58] Field of Search ........................ 528/440, 443; 523/100; 524/507; 427/407.1

[56] References Cited

U.S. PATENT DOCUMENTS 4,452,954  6/1984  Schade et al. ............ 525/440
4,859,760  8/1989  Light, Jr. et al. ........ 525/440
5,310,848  5/1994  Nozaki et al. ............ 525/440
5,739,215  4/1998  Westerhof et al. ......... 528/443

FOREIGN PATENT DOCUMENTS 0 257 144   3/1988  European Pat. Off. .
0 288 964  11/1988  European Pat. Off. .

OTHER PUBLICATIONS

Patent Abstracts of Japan, vol. 009, No. 078 (C–274), Apr. 6, 1985, JP 59 210 975, Nov. 29, 1984.

*Primary Examiner*—Tae Yoon
*Attorney, Agent, or Firm*—Oblon, Spivak, McClelland, Maier & Neustadt, P.C.

[57] ABSTRACT

An organosol polyester coating material, comprising at least one linear and/or branched amorphous polyester in solution, at least one blocked polyisocyanate resin and/or at least one triazine resin, fine powder of less than 150 $\mu$m in particle size of at least one high molecular weight crystalline copolyester in suspension, having a molar mass of from 10,000 to 50,000 g/mol and substantially non-swelling in organic solvent, and at least one organic solvent having a boiling point of more than 160° C., and optionally at least one pigment or inorganic filler, at least one catalyst, and at least one devolatilizing, defoaming, or wetting additive.

14 Claims, No Drawings

ORGANOSOL POLYESTER COATING MATERIALS AND A PROCESS FOR THEIR PREPARATION

BACKGROUND OF THE INVENTION

1. Field of the Invention

The invention relates to organosol polyester coating materials and to a process for their preparation. Coating compositions of this kind are suitable for the thick-layer coating of metallic substrates.

2. Description of the Background

The coating of metallic substrates on industrial strip coating units employs coating materials based on various binder systems. The principal systems are formulated on the basis of polyesters, polyester-polyurethane, PVC (plastisols, organosols) or polyvinylidene fluoride (PVDF). In addition, systems based on silicone-modified polyesters and on epoxy resin or acrylic resin are also employed.

The coating materials, which can be processed in liquid form at room temperature, are applied to strips (steel, zinc-plated steel, aluminum, etc.) on industrial-coating units, generally with roller coating units. This application method has a number of advantages. On typical high-performance units in the coil-coating industry it permits high belt speeds (up to 200 m/min) and ensures highly uniform application of the coating. Film formation and curing of the liquid coating materials on belts takes place in through-type air dryers. The prior art coating materials mentioned can in this case be processed in one dryer pass only with film thicknesses of up to about 30 micrometers ($\mu$m). An exception to this are PVC-based (plastisol) coatings, which can be processed with coat thicknesses in the range 80–200 $\mu$m and, at the same time, at relatively high belt speeds to give thick-layer coatings.

The precoated strips are cut and shaped to produce a large number of industrial products, for example, for the construction industry, in appliance construction, in transport or for the metal packaging industry (can coating). Thick-layer coatings are of particular interest when the product produced from precoated metal is required to have high resistance to corrosive attack, for example in exterior architecture or in interior architecture or when appliances are operated in a humid climate. Thick-layer coatings based on PVC plastisols are notable for outstanding corrosion protection, very good formability, easy selection of color, and ready processability on the coating units. On the other hand, coating compositions of this kind based on PVC have certain disadvantages. Because of very poor adhesion properties on metallic substrates, PVC plastisols can only be processed in two coats on specific adhesion primers (for PVC plastisols). The plasticizers present in typical PVC plastisols are strong swelling agents, so that the selection of the primer is restricted to specific systems.

A critical disadvantage of PVC thick-layer coatings, however, is that the disposal of PVC-coated metal sheets is becoming increasingly problematic and costly.

This is also true for the process of coating metallic substrates on strip coating units by laminar application of PVC films (40–400 $\mu$m film thickness). Although films based on halogen-free polymer (polyolefins, polyacrylate etc.) are available, certain disadvantages are known. For instance, special laminating adhesives are required. Creasing with relatively thin films, electrostatic dust attraction, fluctuations in gloss, and loss of film embossing are known problems of the film lamination process.

Also known is the process of hotmelt coating of metal strips with thermoplastic polymers. A disadvantage of this process is the high mechanical expenditure required for extrusion coating.

DE 40 12 020 describes the thick-layer coating of strips with powder coatings based, for example, on polyester. A disadvantage of this process is the low belt speed, which is limited by the electrostatic application process for the powder coatings.

EP 0 466 310 describes the use of solvent-insoluble crystalline polymers in dispersions having particle sizes which are preferably in the range 1–10 $\mu$m as film-forming constituents for coatings. For the stability of such dispersion coating materials (emulsion paints) specific stabilizers are described as indispensable. According to the statements in this patent document it is not possible to prepare dispersion coating materials using fine powders of crystalline, thermoplastic polymers produced by physical grinding. The reason given for this is that coating materials with an extremely nonhomogeneous structure and, accordingly, poor film properties are the result of this process.

The object on which the invention is based is to develop halogen-free, heat-curing coating compositions for the strip coating process which can be applied as a liquid at room temperature, for example, by the roller coating process, and which can be processed at very high belt speeds to give thick-layer coatings having good mechanical deformability and very good corrosion protection.

SUMMARY OF THE INVENTION

This object is achieved in accordance with the invention with heat-curing coating compositions which comprise solutions of linear and/or branched amorphous polyester resins and also crosslinker resins in organic solvents, on the one hand, and of finely divided crystalline copolyesters suspended in the solution, on the other hand.

The present invention provides organosol polyester coating materials for thick-layer coatings, comprising A) from 10 to 30% by weight of at least one linear and/or branched amorphous polyester in solution, B) from 0.5 to 15% by weight of at least one blocked polyisocyanate resin and/or C) from 0.5 to 15% by weight of at least one triazine resin, D) from 10 to 40% by weight of fine powder of less than 150 $\mu$m in particle size of at least one high molecular weight crystalline copolyester in suspension, having a molar mass of from 10,000 to 50,000 g/mol and being of low swellability in solvents, E) from 0 to 20% by weight of pigments and inorganic fillers, F) from 0 to 1% by weight of at least one catalyst, G) from 0 to 5% by weight of at least one additive, and H) from 25 to 45% by weight of at least one organic solvent having a boiling point of more than 160° C.

DETAILED DESCRIPTION OF THE INVENTION

The polyester resins (A) present in the novel organosol polyester coating materials are state of the art (cf. Ullmann, Encyclopedia of Industrial Chemistry Vol. A 18 "Paint and Coatings", section 2.7 "Saturated Polyester Coatings"). They are prepared from polycarboxylic acids and polyalcohols. Suitable aromatic polycarboxylic acids are terephthalic acid, isophthalic acid, phthalic acid and trimellitic acid.

Other suitable polycarboxylic acids are cycloaliphatic dicarboxylic acids, such as hexahydroterephthalic acid and hexahydrophthalic acid, and linear aliphatic dicarboxylic acids, such as succinic, glutaric, adipic, azelaic, sebacic and decanedicarboxylic acid or dimeric fatty acids. Suitable polyalcohols are glycols, such as ethylene glycol, diethylene glycol, 1,2-propanediol, 1,3-butanediol, 1,4-butanediol, 1,5-pentanediol, 1,6-hexanediol, 2,2-dimethyl-1,3-propanediol (neopentyl glycol), 1,4-cyclohexanedimethanol, and trifunctional alcohols such as trimethylolpropane and glycerol. The polyester resins used have molar masses (number average) in the range 1000–25,000, preferably 2000–7000 (g/mol). The structure of the polyester resins used can be linear or branched, preferably linear or slightly branched. The polyester resins used have corresponding hydroxyl numbers in the range 5–150, preferably in the range 20–80 (mg of KOH/g). The polyester resins used are preferably hydroxyl-containing, but may equally have acid numbers in the range 0–30 (mg of KOH/g). According to the composition, the polyester resins used have glass transition temperatures in the range −50 to +70° C., preferably in the range 0 to +40° C. The polyester resins (A) which are present in the novel organosol polyester coating materials form storage-stable solutions in the paint solvents described below. According to their composition the polyester resins used are noncrystalline (amorphous) and readily compatible with other coatings base materials.

The crosslinker resins present in the novel organosol polyester coating materials are blocked polyisocyanate resins (B) and/or triazine resins (C), blocked polyisocyanate resins being particularly suitable for preparing thick-layer polyester-polyurethane coatings.

Suitable blocked polyisocyanate resins are preferably of triisocyanurate resins based on cycloaliphatic or aliphatic diisocyanates, such as 3-isocyanatomethyl-3,5,5-trimethylcyclohexyl isocyanate (isophorone diisocyanate, IPDI) or hexamethylene diisocyanate (HDI), blocked with oximes (e.g., acetone oxime, butanone oxime), amines (e.g., diisopropylamine) or amides (e.g., β-caprolactam).

Suitable triazine resins are reaction products of melamine or benzoguanamine with formaldehyde, etherified with aliphatic alcohols (e.g., methanol, n-butanol). Oligomeric triazine resins having a relatively low degree of precondensation are particularly suitable for formulating the novel organosol polyester coating materials. In the case of the crosslinking of polyester resins (A) with triazine resins (C), the proportion by weight is from 95:5 to 70:30, preferably from 90:10 to 80:20. Cross-linking of the polyester resins (A) with blocked polyisocyanate resins (B) to form polyester-polyurethane coatings generally starts stoichiometrically, from a molar ratio of the polyester hydroxyl groups to (blocked) isocyanate groups of 1:1, and is preferably in the range from 1:0.8 to 1:1.25.

Polyester-polyurethane thick-layer systems formulated in accordance with the invention with fine powders of crystalline copolyesters (D) show the best deformability on metallic substrates such that after severe deformation of precoated strips a minimum of cracking is evident in the thick-layer coating.

The novel organosol polyester coating materials may include customary paint catalysts (F), which for systems comprising polyester resins and triazine resins are based on sulfonic acids (e.g. dodecylbenzenesulfonic acid, p-toluenesulfonic acid, dinonylnaphthalenedisulfonic acid), preferably in blocked form (as salts with aliphatic amines or adducts with epoxide compounds), or for polyester-polyurethane systems are based on organotin compounds (e.g. dibutyltin dilaurate).

To formulate the novel organosol polyester coating materials it is judicious to use additives (G), especially having a devolatilizing and defoaming effect, and to improve the wetting of pigment surfaces or the metallic substrate surfaces.

The fine powders present in the novel organosol polyester coating materials comprise crystalline copolyesters (D). These copolyesters are state of the art (cf. DE 23 46 559, "Coating powders based on thermoplastic polyesters", Dynamit Nobel AG). Crystalline copolyesters which can be used in accordance with the invention are prepared from dicarboxylic acids and dialcohols. Suitable polycarboxylic acids are preferably aromatic, especially terephthalic and isophthalic acid, and linear aliphatic dicarboxylic acids such as succinic, adipic, sebacic and decanedicarboxylic acid. Suitable polyalcohols are glycols such as ethylene glycol, 1,4-butanediol and 1,6-hexanediol, the copolyesters used have molar masses (number average) in the range 10,000–50,000, preferably in the range 15,000–30,000 (g/mol). The copolyesters used have hydroxyl numbers (terminal hydroxyl groups) in the range 1–10 (mg of KOH/g). According to their composition the copolyesters used have glass transition temperatures in the range from −60 to +70° C., preferably in the range from −50 to +40° C. According to the composition of the crystalline copolyesters which can be used in accordance with the invention and depending on the mixture of the dicarboxylic acids and dialcohols used, respectively, they have melting points in the range from 80 to 250° C., preferably in the range 100–200° C. According to their composition the copolyesters which can be used in accordance with the invention are crystalline. They are insoluble in the paint solvents described below and show little swelling in the solvents when stored at room temperature. The increase in weight by swelling at temperatures up to 50° C. after 24 hours (stirring a granular copolyester sample in SOLVESSO 200S) must not exceed a level of 10% by weight, preferably 5% by weight. Owing to their low swellability, crystalline copolyesters of relatively high molar mass (over 10,000 g/mol, number average) are better suited to preparing the novel organosol polyester coating materials than are low molecular mass crystalline polyester resins.

As film-forming constituents of the novel organosol polyester coating materials, another feature of high molar mass copolyesters is that they show substantially better technical properties, especially with regard to the elasticity/hardness relationship of the coatings. Low molar mass crystalline polyester resins are of poorer flexibility in coatings, but on the other hand, are therefore easier to grind to fine powders.

For use according to the invention, the crystalline copolyesters are ground to fine powders. Grinding can be carried out with customary milling units, for example, with disk impact mills, pin mills or airjet mills, and the material to be milled can be frozen if necessary. The fine powder is preferably employed with a particle size of not more than 150 μm, preferably not more than 100 μm.

In accordance with the invention the fine powders based on the crystalline copolyesters (D) are suspended in the solvent-containing organosol polyester coating materials in an amount of from 10 to 40% by weight. In the course of thermal film formation, the base binders dissolved in the solvents, consisting of polyester resins (A), blocked polyisocyanate resins (B) or triazine resins (C), undergo molecular mixing with the crystalline copolyesters (D) of the fine powders, which are suspended in the novel organosol polyester coating materials, this mixing taking place such that said powders dissolve in the mixture of the base binders no later than at the point where the melting temperature of the crystalline copolyesters is exceeded. By means of their hydroxyl end groups the crystalline copolyesters react both with the crosslinker resins and with the polyester resins (A) which are employed in solution. Various factors, for example the degree of crystallization of the copolyesters (D), their proportion relative to the base binder (consisting of (A), (B) and/or (C)) and/or the cooling rate of the metallic substrate coated in accordance with the invention, determine to what extent crystalline structures are developed in the coating in the course of cooling and solidification thereof, such crystalline structures being evident on the outside of unpigmented films by blushing.

It is essential to the invention that the copolyester particles isolated in suspension prior to thermal film formation undergo molecular dissolution, at least in the external particle shell, in the course of the heat curing of the novel organosol polyester resins, and that the cooling and solidification of the thick-layer coatings are not accompanied by the formation of any new internal phase boundaries, for instance between copolyester particles which are separating out and the surrounding base binder phase. An essential prerequisite for this is the compatibility or miscibility of the hydroxyl-containing polyester resins (A) and the crystalline copolyesters (D), which belong to the same class of saturated polyesters (SP).

The novel organosol polyester coating materials comprise organic solvents (H), boiling range above 160° C., preferably above 220° C., for example aromatic hydrocarbons, esters (e.g. ethyl ethoxypropionate, butylglycol acetate, butyldiglycol acetate, dibasic ester mixture (DBE)), glycol ethers (e.g. butylglycol. butyldiglycol, methyldipropylglycol) or specific alcohols (e.g. benzyl alcohol, n-butanol). The selection of the solvents is guided above all by the proviso that the fine powders of the crystalline copolyesters must not undergo any considerable swelling, which otherwise leads to the thickening of the organosol polyester coating materials. The novel organosol polyester coating materials are suitably formulated using, preferably, aromatic hydrocarbons in the boiling range from 160° C. (e.g. solvent naphtha 100), from 185° C. (e.g. solvent naphtha 150) or from 220° C. (e.g. SOLVESSO 200 S, Exxon).

The proportion of organic solvents in the novel organosol polyester coating materials in the case of unpigmented formulations is from 30 to 45% by weight; in the case of pigmented formulations, from 25 to 40% by weight.

The novel organosol polyester coating materials can comprise pigments and inorganic fillers (E) and other customary additives. Examples of pigments which can be used in accordance with the invention are titanium dioxide or inorganic color pigments (based, for example, on oxides of iron, of chromium and of nickel). It is essential to the invention that the pigmenting of the base binders present in solution in the solvents and comprising polyester resins (A) and crosslinker resins should be possible without problems by dispersing the pigments using the milling units customary in the paint industry (e.g. bead mills), so that the choice and fine adjustment of shades should not be subject to any restrictions whatsoever in the case of the novel thick-layer coatings.

The novel organosol polyester coating materials can be applied to strips using the known, large-scale industrial application techniques for liquid coating materials, for example, with roller coating machines. At customary belt speeds of high-performance units (dryer residence times up to a minimum of 20 seconds) it is possible to apply film thicknesses of more than 30 to 100 μm in one operation or dryer pass. This represents a significant step beyond the known limit to the maximum possible film thickness, of about 30 μm with stripcoatings based on polyester or polyester-polyurethane. The novel organosol polyester coating materials can be processed with very good constancy of film thickness. Color change on the coating unit can be carried out without problems.

In the stripcoating process the curing of the organosol polyester coating materials takes place at metal article temperatures in the range of 190–250° C. with dryer residence times in the range of 20–70 seconds.

Examples of metallic substrates which can be coated in accordance with the invention in the stripcoating process are strips of steel or zinc- or aluminum/zinc-metallized steel or of aluminum. The metal surfaces have been pretreated by customary techniques (for example chromation, alkaline oxidation, phosphation, anodic oxidation) as an important prerequisite for a bond of maximum durability between metal and organic coating.

The novel organosol polyester coating materials can be employed as one-coat and multicoat systems. As topcoats of primer/topcoat systems they require no special primers as is the case, for example, with PVC plastisol topcoats, whose plasticizer constituents may destroy unsuitable primers by swelling (loss of adhesion to the metallic substrate). The novel organisol polyester coating materials can also be employed as a thick-layer primer with layer thicknesses in the range 15 to 30 μm, which can be overcoated with the topcoats customary in the coil-coating sector, based on polyester, polyester-polyurethane or based on polyvinylidene fluoride (PVDF), finally, the novel organosol polyester coating materials can also be applied as single coats to aluminum strips.

The novel thick-layer coatings have very good mechanical properties, with very good deformability and abrasion resistance being particularly noteworthy. Corresponding to the coat thicknesses which can be obtained in accordance with the invention, very good corrosion protection of metallic substrates—even after severe deformation and subsequent corrosive stress—is achieved in practical use. The weathering stability of the novel polyester thick-layer coatings is markedly better than that of the prior art based on PVC plastisols. At relatively high article temperatures in exterior use under sunshine conditions, the crosslinked structure of the novel polyester organosol coating materials means that thermoplastic flow is suppressed, which rules out the use of PVC plastisol-coated metal sheets under, for example, tropical climatic conditions. A final essential feature of the invention is that the disposal (recycling) of metal sheets with thick-layer polyester-based coatings presents no problems.

Examples of industrial articles which can be produced from metallic strips precoated in accordance with the invention are, in the construction industry, for facade facings and roof claddings for exterior use and applications in interior architecture (for example, partitions, elevator cabin interior panels with abrasion-resistant coating, etc.); in general industry, coatings with good corrosion protection (e.g., for appliance panels); in the automotive industry, for example, for the precoating of steel or aluminum panels which can be coated further after forming.

Having generally described this invention, a further understanding can be obtained by reference to certain specific examples which are provided herein for purposes of illustration only and are not intended to be limiting unless otherwise specified. All proportions and percentages are based on weight of the coating base materials indicated.

EXAMPLES

In the examples described, hydroxyl-containing polyester resins (A) which are soluble in solvents are employed in the following variants.

(A 1) is a linear, hydroxyl-containing, saturated polyester resin of medium molecular weight and hydroxyl number 20 (mg of KOH/g), acid number max. 3 (mg of KOH/g), molar mass 6000 (g/mol, number average), glass transition temperature 10–15° C., supply form 50% in SOLVESSO 200 S (Exxon).

(A 2) is a linear, hydroxyl-containing, saturated polyester resin of low molecular weight and hydroxyl number 50 (mg of KOH/g), acid number max. 5 (mg of KOH/g), molar mass 2000 (g/mol, number average) glass transition temperature 10–15° C., supply form 70% in SOLVESSO 100 (Exxon)/butylglycol (80/20).

In fine powders (D) of crystalline copolyesters, the following variants are employed.

(D 1) is a high molecular weight crystalline copolyester having a molar mass of 20,000 (g/mol, number average) glass transition temperature 35–40° C., melting temperature 190–195° C., based on terephthalic acid/1,4-butanediol.

(D 2) is a high molecular, crystalline polybutylene terephthalate, molar mass 25,000, glass transition temperature about 40° C., melting point about 220° C.

(D 3) is a medium molecular, crystalline copolyester having a molar mass of 9,000, glass transition temperature 35–40° C., melting temperature 190–195° C., based on terephthalic acid/1,4-butanediol.

(D 4) is a high molecular, crystalline copolyester having a molar mass of 30,000, glass transition temperature 25–30° C., melting temperature 190–195° C., based on terephthalic acid/monoethylene glycol.

(D 5) is a high molecular, crystalline copolyester having a molar mass of 25,000, glass transition temperature 20–25° C., melting temperature 100–105° C., based on terephthalic acid/1,4-butanediol.

(D 6) is a high molecular, crystalline copolyester having a molar mass of 20,000, glass transition temperature −25 to −30° C., melting temperature 145–150° C., based on terephthalic acid/1,4-butanediol.

The commercial copolyesters (D 1), (D 2), (D 4), (D 5) and (D 6) in the form of white crystalline granules are cooled to a low temperature (liquid nitrogen) and ground to fine powders using appropriate milling equipment (for example on a pin mill), max. particle size 63 $\mu$m. For Example 4, fine powder with a particle size of max. 53 $\mu$m was prepared.

Example 1:

25.0 parts of polyester resin (A 1)/50% in SOLVESSO 200 S are diluted with 3.0 parts of SOLVESSO 200 S and predispersed using a dissolver with 15.0 parts of titanium dioxide pigment (KRONOS 2330) and with 2.0 parts of a mineral antisettling agent (BENTONE 34/10% in xylene/propylene carbonate =87/03). The predispersed pigment paste is subsequently ground in a bead mill to a milling fineness (pigment particle size) of about 10–12 $\mu$m. The mill base is then worked up into a paint with 2.0 parts of polyester resin (A 1). Then, with the dissolver running, 28.0 parts of fine powder of copolyester (D 1) are introduced. After complete homogenization of the semifinished product, 0.8 part of a devolatilizing and defoaming additive and 4.0 parts of a commercial blocked cycloaliphatic polyisocyanate resin (VESTANAT B 1481/65% supply form, NCO content 8.5%, Hüls AG) are added.

The organosol polyester paint is diluted to processing viscosity (40–50 seconds flow time, 6 mm cup, in accordance with DIN 53 211) with 2.0 parts of n-butanol and 18.2 parts of SOLVESSO 200 S (Exxon). The complete formulation of this and further examples is given in Table I.

For laboratory testing and technical assessment as a coating, the organosol polyester coating material is drawn with a spiral doctor blade onto aluminum test panels and in an electrically heated laboratory convection oven (air temperature e.g. 340° C.) is subjected to thermal film formation and curing, observing, in this and further examples, a metal article temperature of 250–260° C. (oven residence time dependent on the panel thickness).

The thick-layer polyester coatings obtained in accordance with this and the further examples were subjected to the following tests.

a) Nonvolatiles content 1 g of wet paint is weighed onto a metal lid (7 cm) and distributed uniformly over the lid area. It is dried for 60 minutes at a convection oven temperature of 180° C. and then backweighed.

b) Surface structure

The surface of the thick-layer coating is assessed visually:

G=glossy, S=silky gloss, M=matt, R=rough c) Maximum achievable coat thickness

Random tests with spiral doctor blades of different size and different resulting wet-film thickness of the wet coating materials applied by knife coating are used to determine that dry-film thickness, after shock drying (article temperature 250–260° C.) up to which the thick-layer coating shows no surface defects (boil marks, pinholes).

Test b) and the tests described subsequently were carried out uniformly with dry-film thicknesses in the range 60–65 $\mu$m. The test results obtained are dependent on the type and pretreatment of the test panels. The test results summarized in Table II were obtained on test coatings on aluminum panels, thickness 0.58 mm, pretreated by chromation.

d) T-bend test

This elasticity test is carried out in accordance with ECCA* procedure "T 20". A coated panel sample is prebent at room temperature by 180° and is first of all deformed in a press without a panel interlayer and with maximum external extension of the coating to give a "O T" bend. Further 180° bends give bending shoulders having a bending radius of "0.5 T" (T=thickness of panel), "1 T", etc. The smallest possible bending radius at which there are still no cracks discernible in the coating at the bending shoulder is found.

e) T-bend boil test

Test d) is made more stringent by immersing the panel bent samples in boiling water (2 minutes) before assessment. In this case there is generally more severe cracking than in the case of test d).

f) T-bend cold test

As test d), but testing takes place on cold panel samples which have been stored at 0–5° C. before testing. This test too generally gives more severe cracking than test d).

g) Impact test

Testing for impact deformability in accordance with ECCA' procedure "T 5". A coated panel sample is subjected to impact deformation with a steel ball (ø 1.27 cm, ½") on the tip of a falling hammer (weight 0.9 kg, variable height of fall) in such a way that the coating is deformed outward. The coating is tested for cracks and adhesion at the deformation site (evaluation: 1=no cracks, 4=severe cracking).

h) Single-coat adhesion

This test is carried out with a sharp knife. An attempt is made with maximum application of force, to scratch off the coating from the panel substrate with the knife (evaluation: 1=removal from the panel substrate impossible, knife only lifts flakes from the paint film; 4=separation of paint film from panel possible with ease).

i) Impression strength

This test is carried out in a press which is set up in a laboratory oven at 50° C. The results indicated in Table II were found after 16 hours of pressing the test coating against sheet metal under a pressure of 1 bar (1 kp/cm$^2$) (evaluation: 1=no impressions, 4=severe impressions and/or sticking of the coating to metal counterpiece).

*(Test method of the European Coil Coating Association).

Examples 2 to 10:

The remaining organosol polyester coating materials are prepared by the method of Example 1; the formulations are given in Table I.

The organosol polyester coating material of Example 2 differs from Example 1 in that 1.5 parts of CYMEL 303 (Cytec) are used as crosslinker resin.

Example 3 differs from Example 1 in that the organosol polyester coating material contains no crosslinking agent.

In the organosol polyester coating material of Example 4, fine powder of copolymers (D 1) with a smaller particle size (max. 53 μm) than in the other examples is employed.

Examples 5 to 8 describe variations of copolyesters (D 2), (D 4), (D 5) and (D 6) as the fine powder base.

Example 9 differs from Example 1 in that, in deviation from the other examples, the fine powder base employed is a copolyester of relatively low molar mass.

Example 10 differs from Example 1 in that, in deviation from the other examples, a hydroxyl-rich polyester resin of low molar mass is employed as the soluble polyester resin (A 2).

Laboratory testing and assessment of the coatings of Examples 2 to 10 took place by the method of Example 1. The test results are compiled in Table II.

Comparing Examples 1 to 3 shows that with appropriate polyurethane crosslinker resins (Example 1 ), it is possible to achieve the best mechanical test results with a thick-layer polyester coating.

Example 4 shows that excessive particle fineness of the fine copolyester powder is disadvantageous for the solids content of an organosol polyester coating material and for the maximum achievable film thickness.

Example 5 shows that an excessive melting point of the fine copolyester powder is disadvantageous for film formation and the resulting paint film properties.

Example 6 shows that crystalline copolyesters based on monoethylene glycols are less suitable for formulating the novel organosol polyester coating materials, because of lower degrees of crystallinity and reduced swelling resistance, than are copolyesters based on 1,4-butanediol.

Example 7 shows that copolyesters based on 1,4-butanediol are less suitable for formulating the novel organosol polyester coating materials when the degree of crystallinity (in correlation with the melting point) and, in association therewith, the swelling resistance are chosen at too low a level.

Example 8, although pointing again to the adverse effect of too low a melting point and swelling resistance, nevertheless shows that in principle it is also possible to employ crystalline copolyesters having very low glass transition temperatures for use in accordance with the invention.

Example 9 shows that crystalline polyesters having low molar masses can also be employed in accordance with the invention.

Example 10 shows that even polyester resins of very low molar mass may be suitable as base binders for combination with appropriate crystalline fine copolyester powders.

Comparison Examples I to III:

The conventional polyester stoving enamels based on polyester resins (A 1) and (A 2) respectively are prepared in the customary manner by diluting the polyester resin solutions with SOLVESSO 200 S and grinding the titanium dioxide pigment (KRONOS 2330) in a bead mill to a milling fineness of about 10–12 μm. Then, with the dissolver running, additives, crosslinker resin and catalyst are added, and finally the paint is adjusted with diluent to processing viscosity (e.g. 110–130 seconds flow time, 4 mm cup, DIN 53211). The complete formulations of Examples I to III are given in Table I, the results of the laboratory tests being in Table II.

The comparison examples show that conventional polyester stoving enamels allow film thicknesses of only up to a maximum of 30 μm in one operation.

Comparison Example IV:

For a system comparison of the novel organosol polyester coating materials with PVC plastisol coatings of the prior art, a PVC plastisol coating composition was prepared.

This was done by dispersing 14.0 parts of titanium dioxide pigment (KRONOS 2330) in 20 parts of plasticizer (dioctyl phthalate) using a dissolver, then, with the dissolver running, 56 parts of PVC fine powder (e.g. VINNOL P 70 F, Wacker) are introduced.

After complete homogenization, 1.7 parts each of two PVC heat stabilizers (based on epoxidized soya oil and on organotin compounds, respectively) are added. Using 3.0 parts of a very high-boiling ester-based solvent (boiling temperature 244–247° C.) and 3.6 parts of high-boiling paint and varnish maker's mineral spirit (boiling range 145–200° C.), the PVC plastisol is adjusted to processing viscosity (40–80 seconds flow time, 6 mm cup in accordance with DIN 53211). The laboratory testing and technical evaluation of the PVC plastisol comparison system was in accordance with Example 1, and the test result is given in Table II.

The comparison example shows the film thickness range of up to 200 μm which can be achieved in accordance with the prior art using halogen-containing thick-layer coatings based on PVC plastisol. Thick-layer coating materials based on this chemistry show no adhesion to a metallic substrate, so that it is necessary to employ special primers for PVC plastisols, which must be resistant to the typical plasticizers used for PVC plastisols. The problems connected with the recycling of PVC-coated metal panels were the starting point for the present invention.

The disclosure of priority German patent application 196 46 640.7, filed Nov. 12, 1996, is hereby incorporated by reference.

Obviously, numerous modifications and variations of the present invention are possible in light of the above teachings. It is therefore to be understood that within the scope of the appended claims, the invention may be practiced otherwise than as specifically described herein.

TABLE 1

| Examples | 1 | 2 | 3 | 4 | 5 | 6 | 7 | 8 | 9 | 10 | I | II | III |
|---|---|---|---|---|---|---|---|---|---|---|---|---|---|
| Polyester resin (A 1) 50% | 27.0 | 27.0 | 27.0 | 29.3 | 27.0 | 31.0 | 31.0 | 29.3 | 27.0 | | 45.0 | | |
| Polyester resin (A 2) 70% | | | | | | | | | | 22.5 | | 33.7 | 35.4 |
| SOLVESSO 200 S | 3.0 | 3.0 | 3.0 | 3.3 | 3.0 | 3.4 | 3.4 | 3.3 | 3.0 | 8.5 | 5.0 | 12.7 | 13.4 |
| TiO₂ (KRONOS 2330) | 15.0 | 15.0 | 15.0 | 16.3 | 15.0 | 17.2 | 17.2 | 16.3 | 15.0 | 15.0 | 25.2 | 31.6 | 30.8 |
| BENTONE 34/10% | 2.0 | 2.0 | 2.0 | 2.2 | 2.0 | 2.3 | 2.3 | 2.2 | 2.0 | 2.0 | | | |
| Copolyester (D 1) | 28.0 | 28.0 | 28.0 | | | | | | | | 28.0 | | |
| (D 1)* | | | | 22.0 | | | | | | | | | |
| (D 2) | | | | | 28.0 | | | | | | | | |
| (D 4) | | | | | | 17.0 | | | | | | | |
| (D 5) | | | | | | | 17.0 | | | | | | |
| (D 6) | | | | | | | | 22.0 | | | | | |
| (D 3) | | | | | | | | | 28.0 | | | | |
| Additive | 0.8 | 0.8 | 0.8 | 0.8 | 0.8 | 0.8 | 0.8 | 0.8 | 0.8 | 1.0 | 0.8 | 0.6 | 0.8 |
| VESTANAT B 1481/65% | 4.0 | | | 4.3 | 4.0 | 4.6 | 4.6 | 4.3 | 4.0 | 6.0 | 5.3 | 12.4 | |
| Tin catalyst (DBTL) | | | | | | | | | | | 0.2 | 0.2 | |
| CYMEL 303 | | 1.5 | | | | | | | | | | | 6.1 |
| Acid catalyst | | | | | | | | | | | | | 0.9 |
| n-Butanol | 2.0 | 2.0 | 2.0 | 2.0 | 2.0 | 2.0 | 2.0 | 2.0 | 2.0 | | | | |
| Butylglycol | | | | | | | | | | | | | 12.6 |
| SOLVESSO 200 S | 18.2 | 20.7 | 22.2 | 19.8 | 18.2 | 21.7 | 21.7 | 19.8 | 18.2 | 17.0 | 16.7 | 7.5 | |
| | 100 | 100 | 100 | 100 | 100 | 100 | 100 | 100 | 100 | 100 | 100 | 100 | 100 |

*Milling fineness max. 53 μm (otherwise all fine powders with max. 63 μm)

TABLE II

| Examples | 1 | 2 | 3 | 4 | 5 | 6 | 7 | 8 | 9 | 10 | I | II | III | IV |
|---|---|---|---|---|---|---|---|---|---|---|---|---|---|---|
| Polyester resin (A) | A1 | A1 | A1 | A1 | A1 | A1 | A1 | A1 | A1 | A2 | A1 | A2 | A2 | |
| Crosslinker resin (B or C) | B | C | | B | B | B | B | B | B | B | B | B | C | |
| Copolyester (D) | D1 | D1 | D1 | D1* | D2 | D4 | D5 | 06 | D3 | D1 | | | | |
| Test results: | | | | | | | | | | | | | | |
| a. nonvolatiles content | 59 | 58 | 57 | 56 | 59 | 53 | 53 | 56 | 59 | 63 | 55 | 57 | 68 | 91 |
| b. surface structure | S | S | S | S | S | S | S | S | G | S | G | G | G | S |
| c. maximum obtainable film thickness | 60 | 50 | 65 | 50 | 60 | 40 | 50 | 40 | 60 | 65 | 22 | 30 | 25 | 200 |
| d. T bend test (cracks) | 0T | 0T | 0T | 0T | 0T | 0T | 0T | 0T | 0J | 0T | 0T | 0.5T | 1T | 0T** |
| e. T bend boil test | 0.5T | 1.51 | 2T | 0.5T | 0.5T | 0.5T | 0T | 0.5T | 0.5T | 0.5T | 0.5T | 1T | 1.5T | 0T** |
| f. T bend cold test | 0T | 0.5T | 1T | 0T | 1.5T | 0.5T | 0.5T | 0T | 0T | 0T | 0T | 0.5T | 1T | 0T** |
| G. imact test | 1 | 1 | 1 | 1 | 4 | 1 | 1 | 1 | 1 | 2 | 1 | 1 | 2 | 1 |
| h. single-coat adhesion | 1 | 1 | 1 | 1 | 1 | 1 | 1 | 1 | 1 | 1 | 2 | 2 | 2 | 4 |
| i. impression strength | 1 | 1 | 3 | 1 | 4 | 4 | 4 | 2 | 1 | 1 | 1 | 1 | 1 | 1 |

*Milling fineness max. 53 μm (otherwise all fine powders with max. 63 μm)
**Can only be employed on special primers for PVC plastisols.

What is claimed as new and is desired to be secured by letters patent of the United States is:

1. An organosol polyester coating material, comprising:
   (A) from 10 to 30% by weight of at least one linear and/or branched amorphous polyester in solution,
   (B) from 0.5 to 15% by weight of at least one blocked polyisocyanate resin and/or
   (C) from 0.5 to 15% by weight of at least one triazine resin,
   (D) from 10 to 40% by weight of fine powder of less than 150 μm in particle size of at least one high molecular weight crystalline copolyester in suspension, having a molar mass of from 10,000 to 50,000 g/mol and substantially non-swelling in organic solvent (H),
   (E) from 0 to 20% by weight of at least one pigment or inorganic filler,
   (F) from 0 to 1% by weight of at least one catalyst,
   (G) from 0 to 5% by weight of at least one devolatilizing, defoaming, or wetting additive, and
   (H) from 25 to 45% by weight of at least one organic solvent having a boiling point of more than 160° C.

2. The organosol polyester coating material as claimed in claim 1, wherein the swellability of component (D) in an organic solvent does not exceed 10% by weight.

3. The organosol polyester coating material as claimed in claim 1, wherein component (D) has a molar mass of from 15,000 to 30,000 g/mol.

4. The organosol polyester coating material as claimed in claim 1, wherein component (D) has a particle size of not more than 100 μm.

5. The organosol polyester coating material as claimed in claim 1, wherein component (D) is obtained from the monomers terephthalic acid and 1,4-butanediol.

6. The organosol polyester coating material as claimed in claim 1, wherein component (B) comprises a polyisocyanate obtained from isophorone diisocyanate and/or hexamethylene diisocyanate, and blocked with oximes, amines and/or amides.

7. The organosol polyester coating material as claimed in claim 1, wherein component (C) comprises a reaction product of melamine and/or benzoguanamine with formaldehyde.

8. The organosol polyester coating material as claimed in claim 1, wherein component (C) is present in a form etherified with aliphatic alcohols.

9. The organosol polyester coating material as claimed in claim 1, wherein component (A) has a molar mass in the range from 1000 to 25,000, a hydroxyl number of from 5 to 150 mg of KOH/g, and a glass transition temperature from −50 to 70° C.

10. The organosol polyester coating material as claimed in claim 9, wherein component (A) has a molar mass in the range from 2000 to 7000, a hydroxyl number of from 20 to 80 mg of KOH/g and a glass transition temperature from 0 to 40° C.

11. The organosol polyester coating material as claimed in claim 1, wherein component (H) comprises at least one aromatic hydrocarbon, ester, glycol ether or alcohol.

12. A process for preparing a thick-layer coating comprising an organosol polyester prepared from the coating material of claim 1, wherein said process comprises (1) depositing said coating as the top coating over a primer coating, or (2) depositing said coating as a single coating as a topcoat, or (3) depositing said coating as a primer.

13. The process preparing thick-layer coatings comprising an organosol polyester, as claimed in claim 12, wherein the process is (1) or (2), and the film thickness of the organosol polyester coating is 30–100 μm.

14. The process for preparing thick-layer coatings comprising an organosol polyester, as claimed in claim 12, wherein the process is (3), and the film thickness of the organosol polyester coating is 15–30 μm.

* * * * *